Dec. 3, 1935.  H. A. ROSE  2,023,100
ELECTRICAL CONVERSION SYSTEM
Filed July 25, 1934  3 Sheets-Sheet 2

WITNESSES:
Fred C. Williams
S. A. Stricklett

INVENTOR
Herbert A. Rose
BY
O. B. Buchanan
ATTORNEY

Dec. 3, 1935. H. A. ROSE 2,023,100

ELECTRICAL CONVERSION SYSTEM

Filed July 25, 1934 3 Sheets-Sheet 3

INVENTOR
Herbert A. Rose
BY
ATTORNEY

Patented Dec. 3, 1935

2,023,100

UNITED STATES PATENT OFFICE 2,023,100

ELECTRICAL CONVERSION SYSTEM

Herbert A. Rose, Pittsburgh, Pa., assignor to Westinghouse Electric & Manufacturing Company, East Pittsburgh, Pa., a corporation of Pennsylvania Application July 25, 1934, Serial No. 736,886

8 Claims. (Cl. 175—363)

My invention relates to an electrical conversion system and particularly to a self-cooled oil insulated rectifier and transformer combination.

In the application of vapor electric converters, it has heretofore been customary to provide separate containers for the transformer and the converter proper, and to separately cool both of these devices. It has also been customary to mount electric converters in substations or other buildings where the external temperatures and other conditions were somewhat controlled. However, in the utilization of converters it is frequently desirable to locate the converters at the point of power consumption and to install the converters in the open air or other places where the surrounding temperature conditions are uncontrolled.

It is an object of my invention to provide converter systems which may be installed at any desired point and which will be self-contained and self-cooled so that the correct operating conditions will be maintained at all times.

It is a further object of my invention to provide a transformer and rectifier system substantially self-contained and capable of full automatic operation.

It is another object of my invention to provide a rectifier and transformer combination in which the no-load or light load losses of the transformer may be utilized to maintain the converter at operating temperatures.

The converter system according to my invention comprises a supply transformer and a multiple valve converter mounted in an outer container and having a suitable cooling fluid, such as oil, for providing the thermal control of the apparatus.

The apparatus according to my invention may be installed either in the open-air or any suitable enclosure, such as an underground vault. When the apparatus is installed in the open-air, it is preferable to provide suitable radiators for radiating the excessive heat to the ambient atmosphere, but when they are mounted underground it is preferable to provide water cooling to dissipate the excessive heat. In any event, suitable thermal responsive devices are utilized for controlling the amount of heat dissipated from the cooling fluid and the conversion system.

Other objects and advantages will be apparent from the following detailed description, when taken in conjunction with the accompanying drawings, in which.

Figure 1:
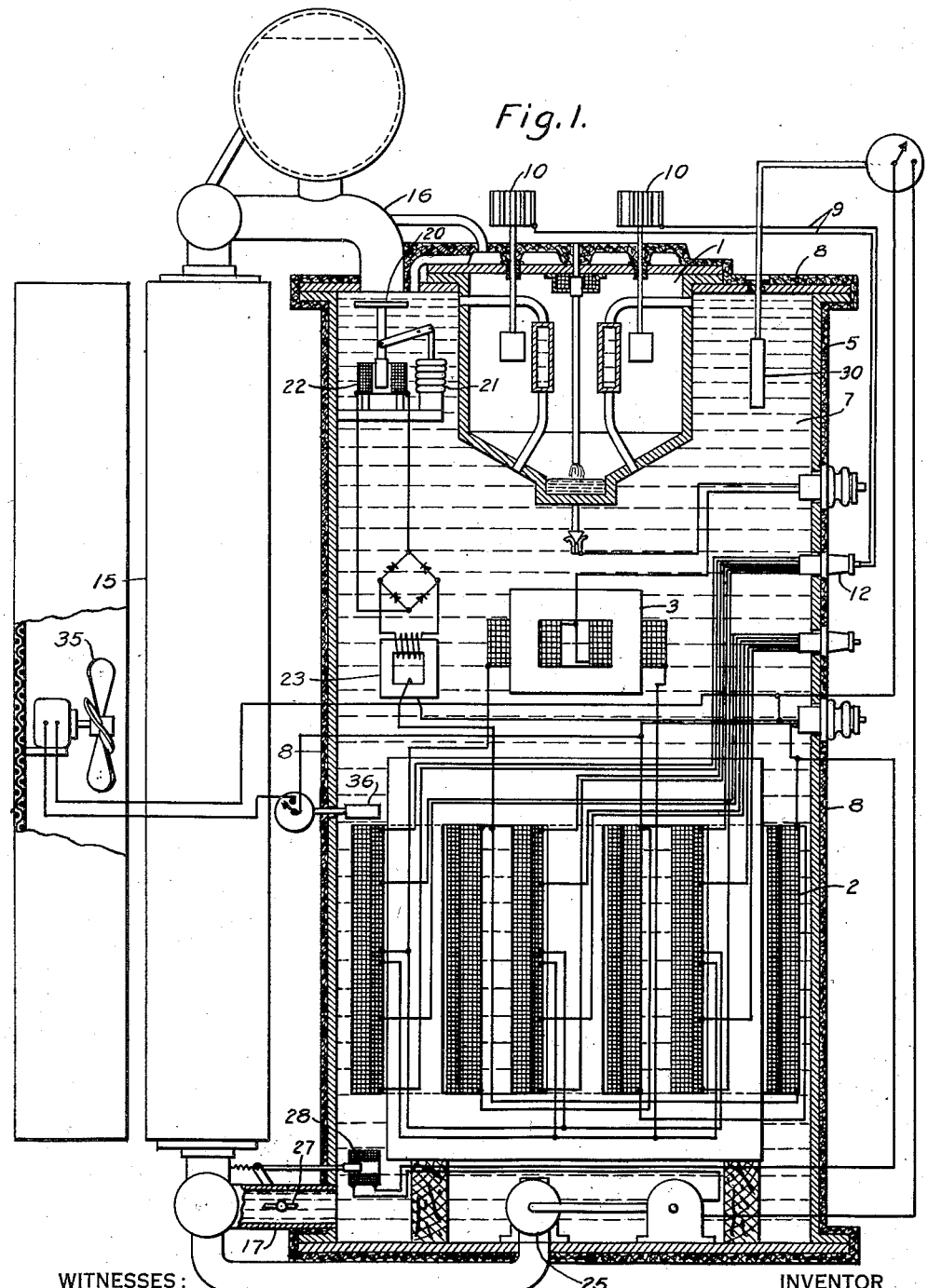
Figure 1 is a vertical elevation, partly in section, of a conversion system according to my invention.

The apparatus according to my invention comprises a vapor electric converter of the multiple valve type illustrated as a multiple anode single cathode converter 1 supplied with energy from an alternating-current system by a suitable supply transformer 2. Preferably, the supply transformer 2 is provided with a suitable interphase transformer 3 to control the mode of operation of the converter 1 and improve the utilization factor of the transformer. The converter 1 and supply transformer 2 are arranged in a suitable container 5 in such manner that the heat generated in the transformer 2 may be utilized for keeping the converter 1 at a suitable operating temperature. This is most easily accomplished by placing the converter 1 directly above the transformer windings and supplying a suitable heat conducting medium, such as oil 7, for conveying the heat from the transformer 2 to the converter 1.

Preferably the container 5 is provided with a thermal insulation 8 for preventing heat loss from the container 5.

If the converter 1 is completely immersed in a cooling fluid 7, the connections 9 between the supply transformer 2 and the valve terminals 10 may be made entirely within the container. The totally submerged internally connected type is particularly desirable for high voltage converters as the lesser spacing necessary between oil immersed conductors materially reduces the size of the installation. However, for low or medium voltages, I prefer to set the top of the converter 1 flush with the top of the container 5 and allow the valve terminals 10 to extend outside the container 5 in which case the connections 9 are made through suitable bushings 12, preferably arranged in the side of the container 5.

Figure 2:
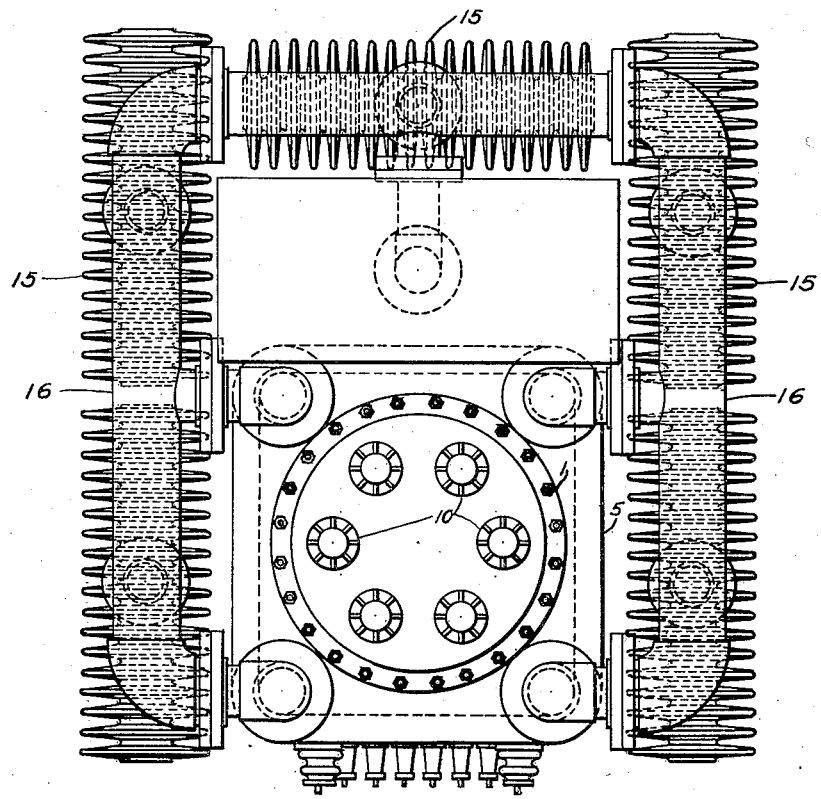
Fig. 2 is a plan view showing the arrangement of the radiators for dissipating heat to the surrounding atmosphere.

If the conversion system is to be air cooled, as shown in Figs. 1 and 2, a plurality of radiator elements 15 are connected by suitable heaters 16—17 to the container 5 in such a manner that if the connections 16, 17 between the container 5 and the radiators 15 are opened, the heated fluid 7 will flow by thermosiphon action upward through the container 5 and into the radiators 15 where it will be cooled and returned to the lower portion of the container 5.

It is desirable that when the converter 1 is inoperative, the radiators 15 should be shut off and the heat generated by the no-load losses of the transformer 2 utilized to maintain the converter at a suitable operating temperature. To this end, I have provided valves 20 between the container 5 and the radiators 15. These valves are controlled by means of suitable thermal responsive elements 21, such as bimetallic or bellows type thermostats.

The thermal responsive devices 21 maintain the thermal condition of the cooling medium 7 at the desired level. However, to anticipate the heat produced by loads it is also desirable to provide auxiliary valve control devices directly responsive to the load. I prefer to provide this auxiliary control in the form of a solenoid 22 energized by a current transformer 23 connected with one of the supply leads of the converter.

The current transformer 23 and the solenoid 22 are preferably so adjusted that for light loads and no-load operation the thermostat 21 controls the valve 20 but for heavy loads the solenoid will open the valve and permit faster circulation of the cooling fluid to anticipate the heating caused by the greater losses at the higher loads.

It sometimes happens particularly at heavy loads that the thermosiphon action does not produce a sufficiently rapid circulation of the cooling medium 7 which results in excessive temperatures in the region adjacent to the converter 1. This condition may be avoided by the use of a circulating pump 25 for increasing the velocity of circulation of the cooling medium 7. Preferably the pump 25 is connected in parallel with the usual return connection 17 from the radiators 15 which is provided with a valve 27 that may be closed by a suitable actuating device 28 when the pump 25 is operative. Preferably the pump is controlled by a suitable thermostatic element 30 placed in the oil 7 adjacent to the converter 1.

In certain modifications where the normal temperature of the ambient air is too high to accord effective cooling or where there is not sufficient natural circulation of the surrounding air, blowers or fans 35 may be utilized to increase the radiation from the radiating surfaces. Preferably, a suitable thermostatic element 36 is provided in the cooling fluid 7 adjacent to the converter 1 for controlling these fans or blowers 35. However, such control may also be provided by electrical load responsive devices (not shown) in either the direct-current or alternating-current system.

Figure 3:
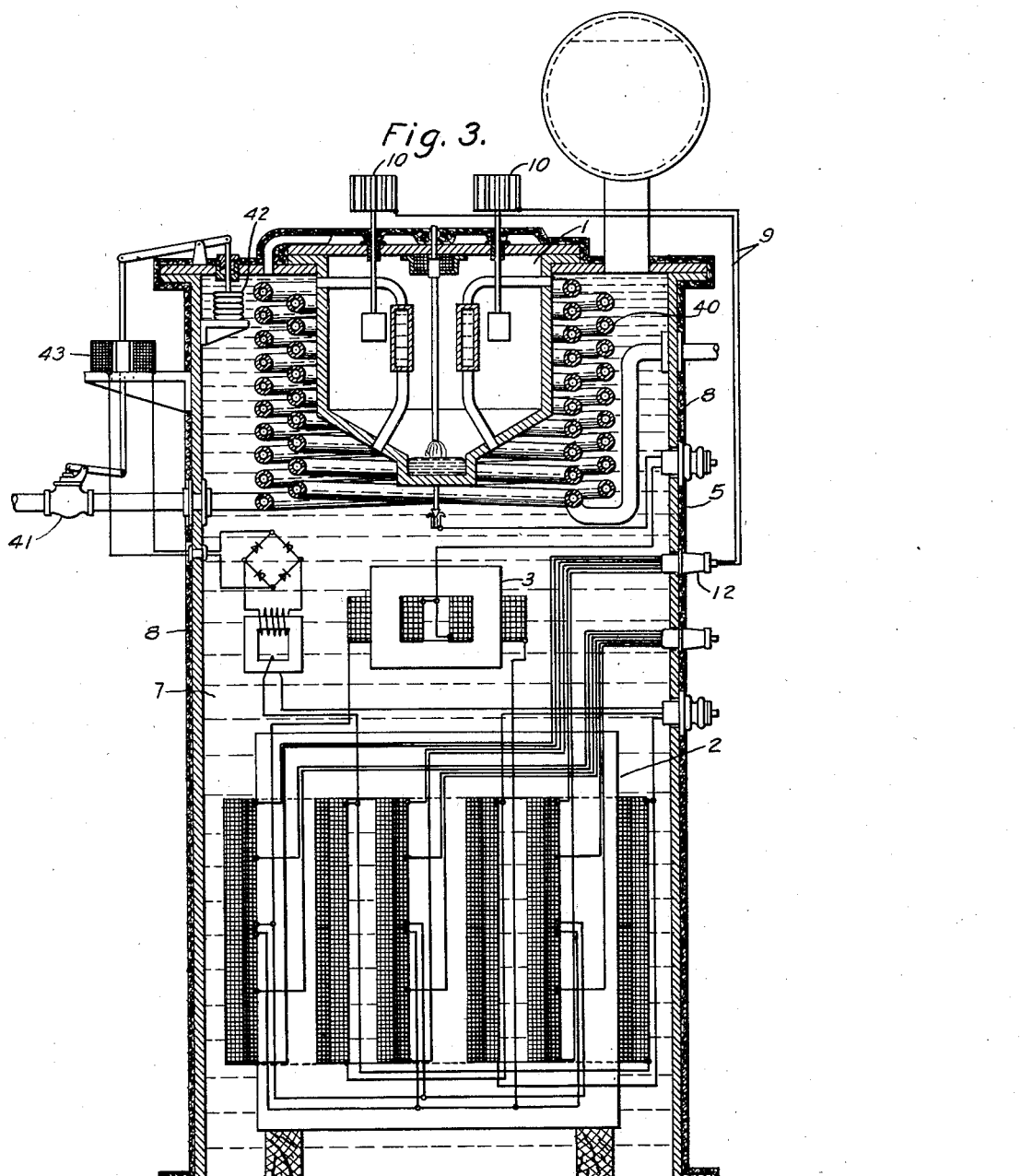
Fig. 3 is a modification similar to Fig. 1 showing the utilization of water cooling for removing excessive heat.

In the modification according to Fig. 3, the conversion system is adapted for underground or indoor installation by removing the external radiators 15 and providing cooling coils 40 preferably within the container 5 and having a valve 41 for controlling the flow of the cooling fluid. Suitable thermostatic elements 42 and load responsive device 43 are used for controlling the circulating fluid system 40 in the same manner that they were used to control the valves 20 of the radiator systems.

In the operation of the system according to my invention, the supply transformer 2 is preferably permanently connected to the alternating-current system so that the no-load losses of the transformer will be constantly available for keeping the converter 1 at an operative temperature. When the converter system is carrying a load, considerable heat will be transferred to the oil 7 filling the container 5, and the thermostatic devices 21 will open the necessary valves 20 to permit cooling of the converter system. The opening of these valves 20 will depend upon the temperature of the oil adjacent to the thermally responsive devices or the amount of the load, and as the oil temperature is controlled almost entirely by the amount of load on the converter 1, the thermally responsive devices 21 are, in fact, responsive to the load conditions of the converter so that the amount of cooling is controlled in response to the amount of load on the converter.

While I have shown and described specific embodiments of my invention it will be apparent that changes and modifications can be made therein without departing from the true spirit of my invention or the scope of the accompanying claims.

I claim as my invention:

1. In combination with a vapor-electric converter, and a supply transformer therefor, a temperature regulating system comprising a container for said transformer and converter, a radiator connected to said container, a fluid of good thermal capacity filling said container and said radiator, said transformer and converter being so positioned in said container that the fluid normally flows from said transformer to said converter, and means responsive to the load condition of said converter for controlling the flow of said fluid to said radiator.

2. An electrical conversion system comprising an alternating-current system, a direct-current system, a transformer interconnecting said systems, a vapor-electric converter for controlling energy transfer between said systems, an oil cooling system for said transformer, an oil bath for said converter, and means for causing oil to flow from said transformer to said converter for utilizing the heat generated in said transformer for heating said converter, heat dissipating elements adapted to cool the oil in said cooling system and means responsive to the oil temperature of the system for controlling oil flow to said elements.

3. A converter system comprising a normally excited transformer connected to a supply system, a load system, a vapor-electric converter for passing energy between said systems, an insulating liquid surrounding said transformer for absorbing the heat generated in said transformer, and means for transmitting said heat to the converted for maintaining it at operative temperatures, means for cooling said liquid and means responsive to the temperature of the liquid for controlling the operation of said cooling means.

4. An electrical conversion installation comprising a vapor-electric converter, a supply transformer connected to said converter, a container for said converter and transformer, a heat exchange device connected to said container, oil filling said container and said heat exchanger, said oil normally flowing by thermosiphon action from said transformer to said converter and thence to said heat exchanger and return, a thermally insulating covering for said container, valves between said container and said heat exchanger, means responsive to the load condition of said converter for controlling said valves, means for increasing the circulating velocity of the oil, means responsive to the temperature of the oil for controlling said circulating means, means for increasing the heat dissipating capacity of said heat exchange device, and temperature responsive devices for controlling said means for increasing the capacity of said heat exchange device.

5. An electrical converter installation comprising a vapor-electric converter, a supply transformer connected thereto, a container for said converter and transformer, a heat insulating jacket on said container, a heat exchange device connected to said container, oil filling said container and heat exchange device, said oil normally circulating through said container and radiator by thermosiphon action and means responsive to the temperature of the system for increasing the velocity of circulation of the oil.

6. An electrical converter installation comprising a vapor-electric converter, a supply transformer connected thereto, a container for said converter and transformer, a heat insulating jacket on said container, a heat exchange device connected to said container, oil filling said container and heat exchange device, said oil normally circulating through said container and radiator by thermosiphon action and means responsive to the temperature of the system for increasing the velocity of circulation on the oil, means for further increasing the cooling capacity of said heat exchange device and a thermally responsive device for controlling said means.

7. An automatic temperature regulating system for a mercury-arc rectifier comprising a supply transformer for said rectifier, a container for said rectifier and transformer, said transformer being normally excited for supplying heat for maintaining said rectifier at a suitable temperature level, a heat insulating covering for said container for retaining the heat provided by said transformer, said means responsive to the load on said rectifier for removing excess heat therefrom.

8. An automatic temperature regulating system for a mercury-arc rectifier comprising a supply transformer for said rectifier, a container for said rectifier and transformer, said transformer being normally excited for supplying heat for maintaining said rectifier at a suitable temperature level, a heat insulating covering for said container for retaining the heat provided by said transformer, a heat exchange device connected to said container and valves responsive to the load on said rectifier for controlling the operation of said heat exchange device.

HERBERT A. ROSE.